(12) United States Patent
Filbert

(10) Patent No.: US 7,393,558 B2
(45) Date of Patent: Jul. 1, 2008

(54) METHODS FOR PRODUCING PROTECTIVE COATINGS

(75) Inventor: Norman V. Filbert, Stevensville, MD (US)

(73) Assignee: ShellBond LLC, Stevensville, MD (US)

( * ) Notice: Subject to any disclaimer, the term of this patent is extended or adjusted under 35 U.S.C. 154(b) by 0 days.

(21) Appl. No.: 11/463,362

(22) Filed: Aug. 9, 2006

(65) Prior Publication Data

US 2007/0093570 A1  Apr. 26, 2007

Related U.S. Application Data

(60) Provisional application No. 60/728,311, filed on Oct. 20, 2005.

(51) Int. Cl.
*B05D 1/12* (2006.01)
*B05D 3/02* (2006.01)

(52) U.S. Cl. ............. 427/180; 427/383.1; 423/173

(58) Field of Classification Search ........ 427/180, 427/201, 216, 226, 247, 287, 383.1, 388.1, 427/397.7; 423/173, 174, 175, 176, 177; 106/764, 796, 817
See application file for complete search history.

(56) References Cited

U.S. PATENT DOCUMENTS

| 4,199,496 | A | * | 4/1980 | Peniston et al. ............ 530/400 |
| 4,367,300 | A | | 1/1983 | Aoki et al. |
| 4,875,938 | A | | 10/1989 | Filbert |
| 4,946,886 | A | * | 8/1990 | Nasu .................... 524/425 |
| 5,244,963 | A | | 9/1993 | Biale |
| 5,324,525 | A | | 6/1994 | Sakuma et al. |
| 6,015,855 | A | * | 1/2000 | Dalton .................. 524/442 |
| 6,248,166 | B1 | * | 6/2001 | Solsvik ................. 106/737 |
| 6,710,117 | B2 | | 3/2004 | Gillard et al. |
| 2006/0003894 | A1 | | 1/2006 | Cutler et al. |
| 2006/0005741 | A1 | | 1/2006 | Yamazaki et al. |

FOREIGN PATENT DOCUMENTS

JP  2002-226554  8/2000

* cited by examiner

*Primary Examiner*—Michael La Villa
(74) *Attorney, Agent, or Firm*—Roberts Mlotkowski Safran & Cole, P.C.

(57) ABSTRACT

A protective coating on a metal surface comprises a particulate material produced by a method including heating an animal skeletal material to a temperature of at least 1000° C. for a time sufficient to convert at least part of the calcium carbonate in the skeletal material to calcium oxide and produce a calcined product; and then contacting at least part of the calcined product with water to produce the particulate material containing calcium hydrate.

6 Claims, No Drawings

METHODS FOR PRODUCING PROTECTIVE COATINGS

FIELD

This application claims priority under 35 USC 119(e) from U.S. Provisional Application Ser. No. 60/728,311 filed Oct. 20, 2005 and relates to protective coatings, particularly but not exclusively corrosion resistant, anti-oxidizing coatings on metal surfaces, together with coating compositions and methods for producing the same.

BACKGROUND

The corrosion of steel and other metal containing products continues to be a serious technical problem that has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, silver, copper, mercury, and barium, among other heavy metals. However the introduction of these materials into the environment can lead to serious health consequences as well as substantial costs to contain or separate the materials or clean up environmental contamination. In addition, the application of these coatings frequently requires the use of organic solvents that can themselves pose environmental concerns.

Various proposals have been made to develop improved surface coating compositions for metallic materials without using organic solvents; for example, the use of coating compositions containing cement mortar. However, the use of cement mortar causes problems in that cracks occur in the protective coatings with the elapse of time and various desired characteristics such as mechanical strength, impact resistance, abrasive resistance, and acid resistance are not obtained. Furthermore, although the addition of various synthetic resin emulsions into the surface coating compositions containing cement mortar has been proposed, the desired characteristics such as water resistance, saline water resistance, weathering resistance, and impact resistance have generally not been obtained. Furthermore, the glossiness and smoothness are unsatisfactory and, therefore, when these surface coating compositions are applied to the surface of metallic materials, the natural metallic luster is impaired.

There is therefore a continuing need for improved protective coatings, and paints for and methods of producing the same, that resist.

In U.S. Pat. No. 4,875,938 there is described a method of making a cementitious binder for use in mortars comprising heating marine shell material to about 2100 to 2350° F. (1150 to 1290° C.); allowing the shell material to cool to ambient temperature; mixing water with the cooled shell material in the ratio of about one part of water by volume to about five parts of shell material by volume; allowing said mixture to spontaneously heat; and monitoring the heat level of said mixture until it commences to cool and as it cools is converted into a dry, substantially white, powdery material that is substantially of the consistency of talcum powder and is useful as a binder in mortar.

Although the mechanism of the processes involved in the production of the cementitious binder described in U.S. Pat. No. 4,875,938 are not fully understood, it is believed that heating of the marine shell to high temperature converts calcium carbonate in the shell to calcium oxide and then the subsequent treatment with water converts the calcium oxide to calcium hydrate, a highly exothermic reaction.

According to the present invention it has now been found that the powdery product of the process described in U.S. Pat. No. 4,875,938 is useful in producing protective coatings on metal surfaces, which coatings are resistant to oxidation of the metal. Moreover, these coatings do not exhibit the tendency to crack experienced with coating compositions containing cement mortar. Moreover, it has been found that the process of U.S. Pat. No. 4,875,938 can be used with a wider variety of animal skeletal materials than shells thereby markedly expanding the scope of raw materials that can be used in the process.

SUMMARY

In one aspect, the invention resides in a protective coating on a metal surface comprising a particulate material produced by a method including:

(a) heating an animal skeletal material to a temperature of at least 1000° C. for a time sufficient to convert at least part of the calcium carbonate in the skeletal material to calcium oxide and produce a calcined product; and (b) contacting at least part of said calcined product with water to produce the particulate material containing calcium hydrate.

In a further aspect, the invention resides in a protective coating composition for metallic surfaces, the coating composition comprising a film-forming binder system having dispersed therein, as a corrosion-inhibiting agent and/or anti-fouling agent, a particulate material produced by a method including:

(a) heating an animal skeletal material to a temperature of at least 1000° C. to convert at least part of the calcium carbonate in the skeletal material to calcium oxide and produce a calcined product; and (b) contacting at least part of said calcined product with water to produce the particulate material containing calcium hydrate.

Conveniently, said film-forming binder system is selected from the group consisting of an acrylic resin, alkyd resin, epoxy resin, polyvinyl acetate, rubber latex and chlorinated rubber.

Conveniently, said film-forming binder system comprises a liquid carrier, which can be an aqueous or organic liquid.

In yet a further aspect, the invention resides in a method of producing a protective coating on a metal surface, the method comprising:

(a) heating an animal skeletal material to a temperature of at least 1000° C. to convert at least part of the calcium carbonate in the skeletal material to calcium oxide and produce a calcined product;

(b) contacting at least part of said calcined product with water to produce the particulate material containing calcium hydrate;

(c) dispersing said particulate material in a liquid carrier; and (d) applying said particulate material dispersed in said liquid carrier to a metal surface to produce a protective coating thereon.

Conveniently, said liquid carrier also comprises a film-forming material.

Conveniently, said skeletal material is an exoskeletal material, such as the shell of a marine animal or a poultry egg.

DETAILED DESCRIPTION OF THE EMBODIMENTS

This invention relates to protective coatings on metal surfaces for resisting corrosion of the surfaces, as well as coating compositions and methods for producing such protective coatings. In particular it is directed to coating compositions containing calcium hydrate produced by calcining animal skeletal material at high temperature, at least 1000° C., and then contacting the cooled calcined product with water.

The skeletal material can be either part or all of the endoskeletal material of an animal, such as the bones of a domestic or farm animal, such as a cow, or can be an exoskeletal material, such as the shell of a marine animal or the shell of a bird's egg, such as a poultry egg. Particularly preferred skeletal materials include marine shells, such as clam and oyster shells, and poultry egg shells.

The skeletal material is initially heated in a suitable kiln to a temperature of at least 1000° C., for example from 1100° C. to 1500° C., typically from 1150° C. to 1300° C. to remove organic material and to convert at least part, and preferably all, of the calcium carbonate in the skeletal material to calcium oxide. In this respect, there is no requirement that the skeletal material be separated from the rest of the animal before being heated in the kiln since, at the high temperatures involved, all residual organic material will be burned off. In addition, the skeletal material can be introduced into the kiln without prior treatment or, more preferably, can be crushed, chopped or otherwise comminuted before being introduced into the kiln.

The time required for the conversion of the skeletal material to calcium oxide will depend on many factors, including the rate of heating and final temperature of the kiln, the type of skeletal material and the degree of conversion sought. In general, however, the skeletal material need only be heated to the appropriate final temperature and does not need to stay at that temperature for any length of time for significant conversion of the calcium carbonate in the skeletal material to calcium oxide. When the calcination is complete, the skeletal material is allowed to cool throughout back down to ambient temperature. The skeletal material at this stage can be coarse, or granular substance in which, in the case of marine shells being used as the skeletal material, recognizable flakes of the shells in their respective colors, e.g., white for clam and egg shell, cinnamon or brownish for oyster shells, etc. can be readily detected.

After the calcined skeletal material has cooled to, or approaching, ambient temperature, water, which can be either fresh or saline and can even be taken directly from a brackish source, such as a bay, or from the open ocean, is mixed with the calcined skeletal material to convert the calcium oxide to calcium hydrate, $Ca(OH)_2$. As is well known, this hydration reaction is highly exothermic and can result in a rapid rise in the temperature of the skeletal material/water mixture and the evolution of steam. The relative ratio of the water to the calcined skeletal material is not critical but in general at least 1 part by volume, preferably 2 to 8 parts by volume, more preferably 4 to 6 parts by volume, most preferably about 5 parts of the calcined skeletal material are mixed with 1 part by weight of water.

The temperature of the mixture of water and calcined skeletal material is monitored and typically rises spontaneously to almost 100° C. and then remains at this level for a period of time as the hydration reaction proceeds, When hydration is complete, the temperature starts to fall and, at a visually recognizable point during this fall of the temperature, the previously coarse, vari-colored calcined skeletal material converts, without further treatment as by crushing in a ball mill, into a white or substantially white homogeneous, fluffy powdery calcium hydrate.

The resultant calcium hydrate is used to produce a corrosion resistant metal coating composition by dispersing the hydrate in a carrier liquid, which can be organic or aqueous, preferably together with a film-forming material. The calcium hydrate is usually employed in coating composition in amounts ranging from 5 to 95% by weight of the coating composition. Suitable film-forming materials for use in the composition include acrylic resins, alkyd resins, epoxy resins, polyvinyl acetate, rubber latex and chlorinated rubbers. In addition the coating composition can include additives, such as pigments, fillers, dyes, coloring agents, such as titanium dioxide, zinc oxide, magnesium silicate, silica, mica, and calcium carbonate, fungicides, algaecides, and compatible thinners.

The resultant coating composition can be applied directly to bare metal or over an adhesion promoting primer. The preferable choice of application is the direct coating of a clean grease-free metal surface, however, many industrial applications require a stronger bond of paint to metal. This is generally achieved by employing an adhesive promoting primer which contains the corrosion inhibiting hydrate. However, if acrylic latex or chlorinated rubber type binder resins are employed, no primer coat is required in addition to the corrosion inhibitor. When the coating composition is applied to a metal surface that has been cleaned by a process involving acid treatment, the surface should be washed thoroughly with water to remove all traces of the acid before the coating composition is applied.

The present surface coating composition can be advantageously applied to various metallic materials such as inner and outer wall surfaces of various tanks, chemical plants, various heavy steel structures such as bridges and steel towers, general steel structures such as roofs and inner and outer walls of buildings, the inside and outside surface livings of various steel pipes (e.g., tap water, sewage, water supply, oil or petroleum transportation, and coal/oil mixture (COM) transportation). When applied to such surfaces and allowed to dry, the coating composition is effective in preventing corrosion, such as rusting, of the surfaces and also exhibits excellent water resistance, solvent resistance, and mechanical strength.

The invention will now be more particularly described with reference to the following Example.

EXAMPLE 10 lbs (4.5 kg) of oyster shells are placed in a kiln and are heated to 2150° F. to 2350° F. (1177° C. to 1288° C.). The kiln is then turned off and allowed to cool to room temperature. After cooling, the heated shell, which is in the form of coarse cinnamon or brownish flakes, is removed from the kiln and placed in a bucket. Water is added to the bucket in amount to provide about five parts by weight of heated shell to each part by weight of water. The temperature of the water rapidly rises to almost 100° C., with significant amounts of steam being emitted from the bucket. The temperature in the bucket then begins to fall and after the temperature returns to ambient the contents of the bucket are removed and found to be in the form of a fine white or substantially white homogeneous, powder. The yield of the fine white powder, calcium hydrate, is about 8 lbs (3.6 kg).

A white paint is formed by mixing the following components in a blender:

(a) 8 oz (227 g) of the calcium hydrate produced as above;

(b) 12 to 16 oz (340 to 454 g) of water;
(b) 4 to 6 oz (113 to 170 g) of a filler in the form of Ag lime or synthetic resin; and
(c) 8 oz (227 g) a linseed oil or other oil carrier.

The paint can be applied by spraying to a treated or untreated steel surface and is found to render substantially resistant to rusting.

While the present invention has been described and illustrated by reference to particular embodiment, those of ordinary skill in the art will appreciate that the invention lends itself to variations not necessarily illustrated herein. For this reason, then, reference should be made solely to the appended claims for purposes of determining the true scope of the present invention.

I claim:

1. A method of producing a protective coating on a metal surface, the method comprising:
    (a) heating an animal skeletal material to a temperature of at least 1000° C. to convert at least part of the calcium carbonate in the skeletal material to calcium oxide and produce a calcined product;
    (b) contacting at least part of said calcined product with water to produce a particulate material containing calcium hydrate;
    (c) dispersing said particulate material in a liquid carrier to produce a coating composition comprising said particulate material; and
    (d) applying said coating composition to a metal surface to produce a protective coating thereon.

2. The method of claim 1 wherein the skeletal material is endoskeletal material.

3. The method of claim 1 wherein the skeletal material is exoskeletal material.

4. The method of claim 1 wherein the exoskeletal material comprises a shell of a marine animal or a poultry egg.

5. The method of claim 1 wherein said coating composition further comprises a film-forming material.

6. The method of claim 1 wherein contacting (b) comprises mixing at least 1 part by volume of said calcined product with 1 part by weight of water.

* * * * *